Sept. 19, 1944.   C. A. NERACHER   2,358,469
FLUID COUPLING
Filed Feb. 13, 1941
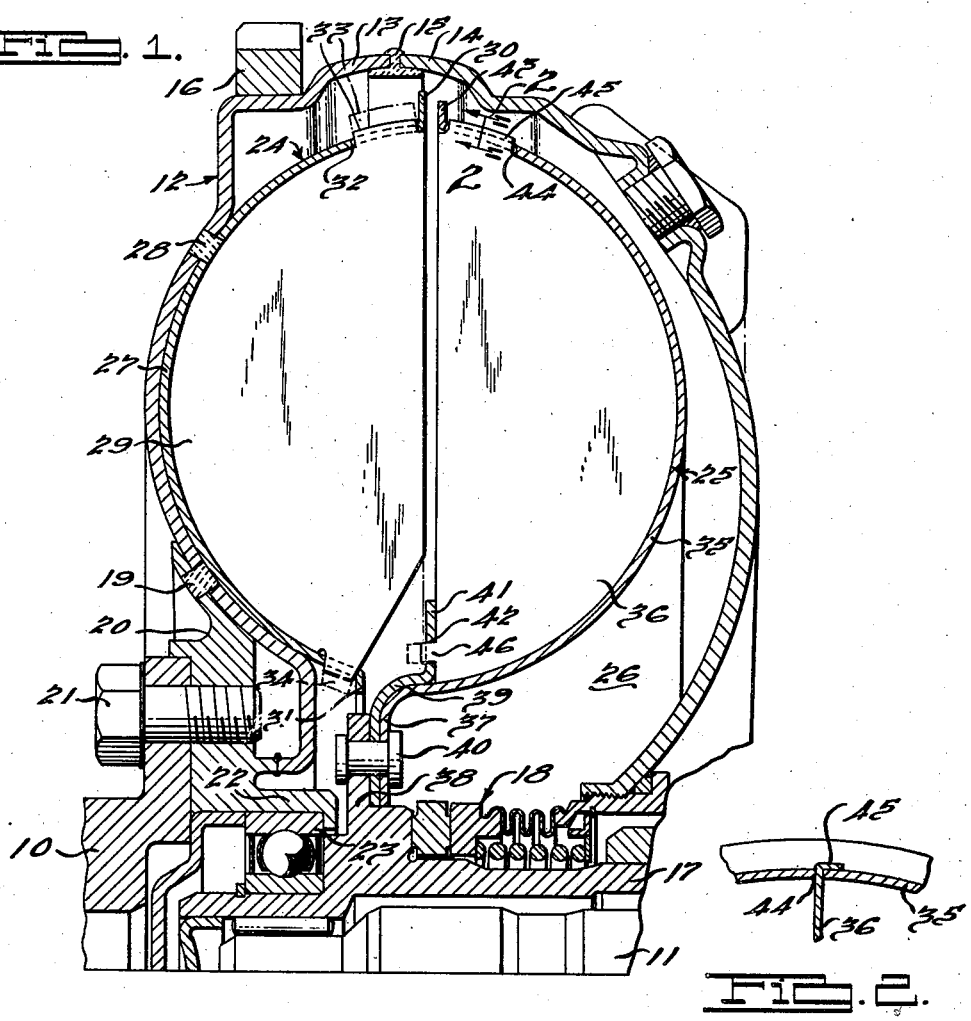
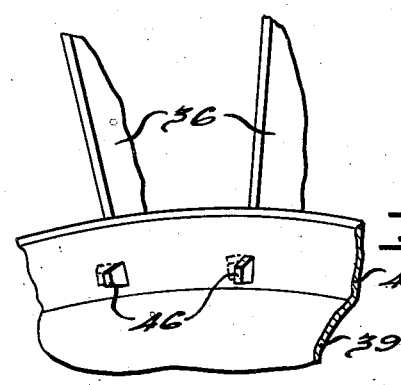
INVENTOR
Carl A. Neracher
BY
Harness, Dickey, Pierce & Harris
ATTORNEYS.

Patented Sept. 19, 1944

2,358,469

UNITED STATES PATENT OFFICE 2,358,469

FLUID COUPLING

Carl A. Neracher, Detroit, Mich., assignor to Chrysler Corporation, Highland Park, Mich., a corporation of Delaware Application February 13, 1941, Serial No. 378,739

1 Claim. (Cl. 60—54)

This invention relates to fluid couplings of the kinetic type.

An object of the invention is the provision in a coupling of the foregoing type of a fluid working chamber characterized by smooth and interrupted lines such that the normal flow of fluid is not impeded or interrupted, particularly when the coupling is operating under relatively low or no slip condition, thus providing a coupling which is highly efficient in the transmission of driving torque under average cruising conditions.

Another object of the invention is the provision in a coupling including cooperating vaned structures of improved means for securing the vanes thereof in fixed position, and to provide means of this character which does not adversely affect the flow of fluid in the working chamber when the coupling is operating under relatively low or no slip condition. More particularly the invention provides vane securing means which does not extend into the working chamber so as to interrupt or impede the flow of fluid when the coupling is operating under relatively low or no slip condition.

A still further object of the invention is the provision of vane securing means which will expedite and facilitate manufacture of the coupling and which will impart thereto strength characteristics.

Another object of the invention is the provision of means which impedes relatively high fluid circulation velocity between the runner and impeller structures of the coupling thereby serving as a baffle to facilitate a relatively high slip condition, which means also cooperates in securing the vanes in fixed position.

Other objects of the invention will be more apparent from the following description taken in connection with the accompanying drawing, in which:

Fig. 1 is a sectional elevational view through a coupling embodying the invention.

Fig. 2 is a fragmentary sectional view taken as indicated by the line 2—2 of Fig. 1.

Fig. 3 is a view similar to Fig. 2 but showing the attachment of the vanes at the radially inner ends thereof.

The invention is illustrated and described in connection with a fluid coupling of the kinetic type having a toroidal circuit for the working liquid formed by juxtaposed annular vane impeller and runner structures, dished in cross section and opening one toward the other, these structures preferably being principally fabricated from sheet metal stampings. While the improved coupling is particularly adapted for establishing a drive between a driving part such as the crank shaft 10 of an internal combustion engine, and a driven part such as the shaft 11, it will be understood that couplings embodying the invention can be utilized in drives other than those for motor vehicles.

The coupling includes an annular casing 12 preferably of sheet metal and having separately formed walls 13 and 14, edge portions thereof being secured together as at 15. When employed as herein contemplated, the coupling functions as a fly wheel structure and is provided with a ring gear 16.

The casing wall 14 has a central opening therein through which extends a hub-forming sleeve 17 journalled on the driven shaft 11 and adapted to be operably connected thereto by a suitable clutch (not shown), although if desired the sleeve can be splined to the shaft 11. A sealing unit, generally designated by the numeral 18, cooperates with the hub 17 to seal the opening in the casing wall 14. The casing wall 13 is drivingly secured as by welding at 19 to a centrally apertured annulus 20 which, in turn, is secured by a plurality of bolts 21 or the like to a flange of the driving shaft 10. The hub-forming sleeve 17 is journalled in a flange 22 of the annulus 20 by a bearing unit 23.

Positioned within the casing 12 in juxtaposed relationship are the impeller and runner structures, generally indicated at 24 and 25 respectively cooperating to form a working chamber for the circulation of the fluid operating medium, each structure including a plurality of circumferentially spaced, radially extending vanes providing fluid passages. In addition to the working chamber there is also provided within the casing 12 an evacuating chamber 26 communicating with the working chamber.

The impeller structure includes an annular dish-shaped sheet metal vane carrier or retainer 27 secured to the casing wall 13 by welding, as indicated at 28, and having a plurality of circumferentially spaced radially extending vanes, one of which is indicated at 29 preferably of sheet metal. The inner and outer edge portions of the carrier 27 are flanged as indicated at 30 and 31 respectively, this arrangement facilitating handling of the retainer and vanes during assembly operations and to improve the strength characteristics of the structure.

The outer edge portion of the carrier 27 is provided with a plurality of circumferentially spaced slots, one of which is shown at 32, adjacent the flange 30, and the inner edge portion thereof is similarly slotted adjacent the flange 31. Each vane 29 is provided with a tab 33 in the radially outer end portion, which tab extends through a slot 32 of the carrier 27 and is folded over on the outside surface thereof so that the tabs are disposed without the fluid working chamber and hence do not adversely interrupt or impede the normal flow of fluid within the latter. The radially inner end of each vane 29 is provided with a tab 34 which extends through one of the slots adjacent the flange 31 and is folded over on the outside surface of the carrier. In this manner the tabs 33 and 34 are not disposed within the passages provided by the adjacent vanes. Any tendency of the foregoing slots to elongate in a direction toward the free edge of the carrier is minimized by the flanges 30 and 31.

The runner structure includes an annular dish-shaped vane carrier or retainer 35, preferably formed of sheet metal opening toward the impeller structure and having a plurality of circumferentially spaced, radially extending sheet metal vanes 36. The carrier 35 has a central section 37 provided with an opening therein through which extends the sleeve forming hub 17, the latter having an annular radially extending flange 38. An annular baffle member 39 has a portion thereof parallel with and disposed between the flange 38 and section 37, the baffle 39, flange 38 and section 37 having a plurality of registering openings receiving rivets, one of which is shown at 40, by which a baffle 39 and carrier 35 are drivingly secured to the sleeve 17. The baffle 39 has a portion 41 thereof extending into the fluid working chamber in abutting relationship to the vane edges and is provided with a plurality of circumferentially spaced slots, one of which is indicated at 42.

The carrier or retainer 35 has the radially outer free edge portion thereof flanged as at 43 and adjacent the latter is provided with a plurality of circumferentially spaced slots one of which is shown at 44. Each vane 36 has a tab 45 which extends through one of the slots 44 and is folded over on the outer surface of the retainer 35. Each vane is also provided with a tab 46 adjacent the radially inner end thereof which extends through a slot 42 in the baffle portion 41 and is bent over the surface thereof adjacent the impeller structure 24. The tabs 46 are preferably tapered so that when inserted through a slot 42, a wedging effect is obtained in the final assembly.

If desired each vane may be welded to its carrier by any suitable method such as by effecting a copper-hydrogen weld between an edge of the vane and the carrier, and during this operation the folded over portion of the tabs 33, 34, 45, 46 can also be similarly welded to the carrier or may be spot-welded thereto. When the foregoing copper-hydrogen welding is employed, these tabs serve to prevent distortion of the structure due to the action of the relatively high temperature present during such operation.

The baffle portion 41 extending into the fluid working chamber has the effect of interrupting the relatively high circulation velocity of the fluid in the working chamber and thereby increase the slip condition between the impeller and runner structure, particularly when it is desired to maintain the motor vehicle at rest with the engine operating at an idling speed, it being understood that under these conditions fluid is being transferred from the impeller structure to the runner structure at the radially outer portion of the coupling and returned to the impeller structure at the radially inner portion of the coupling adjacent the baffle. During cruising operation of the vehicle, however, when there is relatively little or no slippage between the coupling structures and relatively low fluid circulation velocity, the baffle does not interfere with fluid circulation inasmuch as the path of flow has moved radially outwardly beyond the baffle.

I claim:

In a fabricated fluid coupling of the kinetic type including juxtaposed vaned impeller and runner structures cooperating to form a fluid working chamber, hub means for rotatably mounting said runner structure, said runner structure including a dished sheet metal vane carrier having an annular radially extending flange at the radially outer portion thereof and a series of circumferentially spaced notches adjacent said portion, a plurality of circumferentially spaced radially extending sheet metal vanes defining fluid passages in said runner structure, each of said vanes having a tab projecting through a notch of said series and deformed to overlap the surface of the carrier exterior to said chamber, a baffle member secured to said hub means for rotation with said runner structure and having a portion thereof overlying the radially inner portion of said passages and abutting an edge of said vanes, said baffle having a series of circumferentially spaced tab receiving notches and each of said vanes having a tab deformed into securing engagement with a respective baffle notch, said tabs being tapered whereby to effect wedging engagement with their respective notches.

CARL A. NERACHER.